W. F. DREW.
ELECTRIC KEYBOARD FOR CALCULATING MACHINES, TYPE WRITING MACHINES, AND THE LIKE.
APPLICATION FILED APR. 30, 1918.
1,311,384.
Patented July 29, 1919.
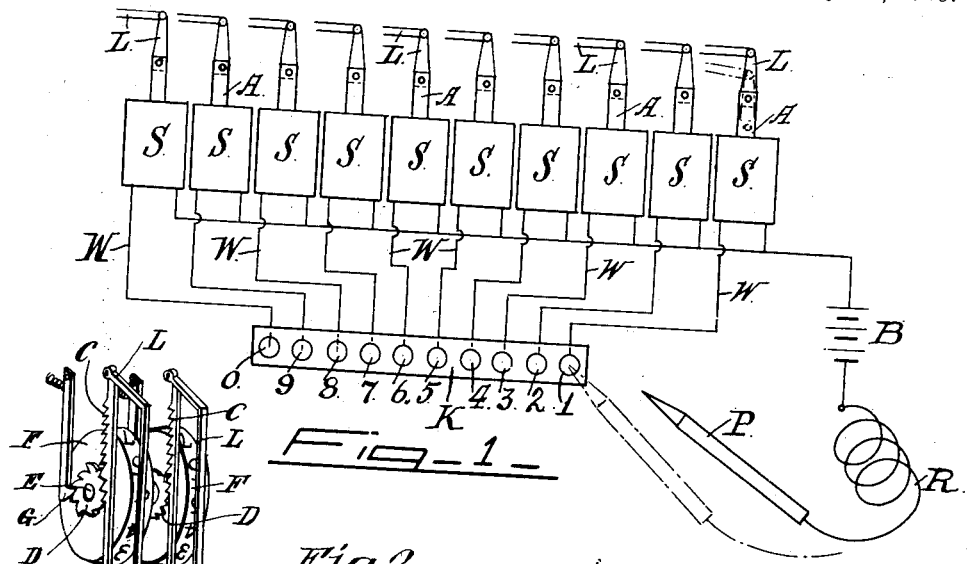
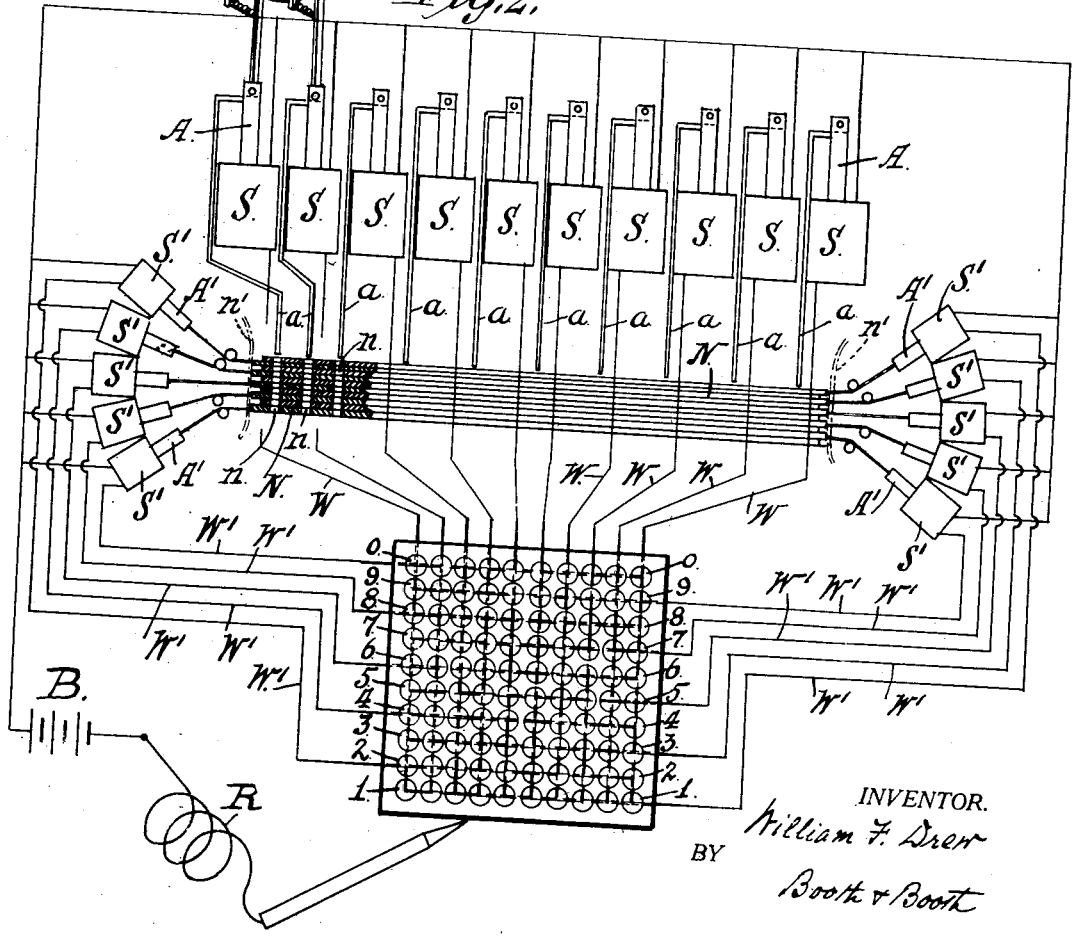
INVENTOR.
William F. Drew
BY
Booth & Booth
ATTORNEYS.

UNITED STATES PATENT OFFICE.

WILLIAM F. DREW, OF OAKLAND, CALIFORNIA.

ELECTRIC KEYBOARD FOR CALCULATING-MACHINES, TYPE-WRITING MACHINES, AND THE LIKE.

1,311,384. Specification of Letters Patent. Patented July 29, 1919.

Application filed April 30, 1918. Serial No. 231,706.

*To all whom it may concern:*

Be it known that I, WILLIAM F. DREW, a citizen of the United States, residing at Oakland, in the county of Alameda and State of California, have invented certain new and useful Improvements in Electric Keyboards for Calculating-Machines, Type-Writing Machines, and the like, of which the following is a specification.

My invention relates to electric key-boards for a recording machine.

The object of my invention is to provide a simple, accurate and easily operated key-board for electrically actuating a recording machine; and to this end, my invention consists in the novel electric key-board which I shall hereinafter fully describe, by reference to the accompanying drawings, in which:

Figure 1 is a plan of my key-board, showing it in its simplest form.

Fig. 2 is a similar view, partly in section of my key-board showing it for more complex relations.

For simplicity, I shall herein describe my key-board in terms of numerals for a calculating machine, though it is to be understood that, according to the nature of the machine, the key-board will be properly inscribed with letters, figures and characters suitable for a typewriting machine or for any other recording machine.

Referring to Fig. 1, K indicates the key-board foundation plate or slab, in which there are ten contacts, indicated by the numerals 1, 2, 3, 4, 5, 6, 7, 8, 9 and 0.

These may be termed key-contacts, and each forms a pole of a separate electric circuit indicated in part by the wires W. These wires lead respectively to electrically operatable devices, say, for example, solenoids, as here indicated by S. A indicates the armatures of these solenoids, and L connections therefrom.

These connections in Fig. 1 merely illustrate a portion of any suitable transmission mechanism to operate the recording devices of the machine to which the key-board is applied.

The electric circuits continue from the solenoids to the battery B, as shown.

P is a stylus-like instrument, which being connected with the battery by the flexible electric-conductor R which is its sole connection, forms the other pole of the electric-circuits. The stylus as, for convenience, I shall herein call it, is an electric conductor with an insulating cover to enable it to be handled by the operator.

The use of the key-board is apparent from the dotted position of the stylus. When the latter touches the key-contact 1, the electric circuit is established through the solenoid S on the extreme right, with the effect, as shown in dotted lines of moving its armature A, and transmitting said movement, through the connections L, to the corresponding recording mechanism of the machine, to which the key-board is applied. Similarly, the contact, by the selective action of the operator of the stylus with any of the other key-contacts will effect the desired result, through the respective solenoid.

The description heretofore given is of the simplest form of the device, and illustrates its essential principle, but, in order to show its application in more complex relations, reference may be now had to Fig. 2, which I shall now describe, still, for the sake of illustration, in terms of a calculating machine.

In this figure, similar parts to those of Fig. 1, are similarly designated and need not be repeated.

In this figure the key-contacts are multiplied by ten, each horizontal row of ten representing a digit, the top row being zero. There is a main solenoid for each vertical row, but in order to provide for a variable operation of each solenoid armature according to any selected digit or zero of any horizontal row there are means for limiting the movement of the armature according to the particular contact in any horizontal row touched by the stylus. This will be more fully understood from the following. N indicates a tier of ten plates, each slidable in the series. These plates are provided with holes *n* which normally register, being held and returned by springs *n'* at the ends, said normally registering holes lying directly in line with stop rods *a* of the armatures A. The plates are connected each with a corresponding armature A' of a second series of solenoids S'.

If the uppermost plate be moved over so that its holes *n* are thrown out of line with the stops *a*, then any given armature A, of the main solenoids S can descend no farther than is defined by the contact of its stop *a* with the imperforate portion of the plate. So too, if the second plate only be moved over, the stop *a* of any given armature A, will move down only into the hole of the first plate and be arrested by the imperforate body of the second plate; and likewise with each plate of the tier series, whereby it results that a given variable movement of each armature is thus possible.

The object of this is, of course, to provide for variable movement of the operating mechanism of a given recording machine, in order to define the record made as units, tens, hundreds, thousands, etc. For example, if the recording devices be carried on drums, the record of any given number as to its place in column will depend upon the degree of rotation which the drum receives, and this rotation is dependent upon the degree of movement of the armature A. For example, I have shown the levers L as carrying spring-controlled rack-pawls C, which mesh with ratchets D on a shaft E which carries drums F on the periphery of which are the numerals corresponding to the key-contacts. Spring controlled retaining pawls G act on said ratchets D to control them. Thus when the armature A of any given solenoid is drawn down, the rack-pawl C of said armature will turn the corresponding drum through such partial revolution as the extent of movement of the armature may effect, and thereby bring the desired number into place. In this movement the ratchet D slips the retaining pawl G, but on the return movement, the rack-pawl slips the ratchet while the pawl G holds it.

Following this system out in Fig. 2, as herein illustrated, the lower horizontal row of key-contacts are all 1's, the next 2's and so on up, rising to the top which are all zeros.

The main solenoid circuits W are from each vertical row of key contacts to a solenoid S respectively, and other circuits W' are from each horizontal row of key-contacts to the second series of solenoids S' respectively.

Suppose now that the number 111 be desired to be recorded. With the stylus the key contact at the extreme right of the lowest row is first touched. The first effect of this is through the wire W' and solenoid S' at the top of the right hand group of five to move the top plate N of the tier over to the right, thereby throwing its holes *n* out of register with the holes on the other plates. The second effect is, through the wire W, and the main solenoid S on the extreme right, to move the armature A of said solenoid down. But this movement is defined by the arrest of the stop *a* of said armature contacting with the imperforate body of the top plate N, and this limited movement is such as before explained, to cause the machine to record the numeral 1 in the unit column.

As soon as the circuit is broken by the removal of the stylus, the spring *n'* on the right restores the top plate N to original position. Now, with the stylus the key-contact in the bottom row immediately to the left of the one previously affected, is touched. This contact being in the second vertical row has the effect of again moving the top plate N over by the same solenoid S' as before but, through the wire W of the second vertical row, the second main solenoid S is energized, which, limited in the movement of its armature by the plate N, as before, causes the recording machine to place a "1" in the tens column of the record. Then the next key contact in the lowest horizontal row, which contact also lies in the third vertical row, is touched with the stylus, and now the third main solenoid S is affected to cause the machine to place a "1" on the hundreds column.

One example more will be sufficient. Take the number 236. The key contact on the extreme right of the "six" row is first touched with the stylus. This has the effect, through wire W' of energizing the middle solenoid S' of the group on the left, whereby the sixth plate N is moved over to serve as a stop. Then through the wire W, the first main solenoid S on the extreme right is energized, to cause the record of "6" in the unit column. Now the key-contact in the "three" row which lies next to the extreme right is touched. This energizes the solenoid S' next to the top in the right hand group, with the effect of pulling over the third plate N to act as a stop. Also, through the wire W, the second main solenoid S is called into action to cause the recording machine to place a "3" in the tens column of the record. Finally, the key contact third from the right hand end of the "two" row is touched, with the effect of operating the top solenoid S' of the left hand group to pull the second plate N over to serve as a stop; and also the third main solenoid S is affected to cause the machine to record a "2" in the hundreds column.

It is obvious that for the various conditions of calculation, the key contacts may be touched by the free stylus in any sequence or order desired.

It will be understood that the key-board slab K with its key-contacts, and the stylus P may be as intimately or as remotely connected with the recording machine as may be desired. As these parts have no other physical connection with the recording machine than that which the circuit wires afford, they may be separated from the machine by any distance, and, moreover, the device may be used to operate a plurality of recording machines, as the matter is merely one of electrical connections.

I claim:—

1. An electric key-board for the described purpose, comprising multiple rows of the duplicated key-contacts; electrically operated means adapted for connection with the recording mechanism of the machine to which the key-board is applied; electric circuits including said rows of key contacts and operatable means respectively; other electrically operated means; electric circuits including said duplicated key-contacts and said other operatable means respectively; means operated by said other electrically operatable means for variably limiting the operation of the first electrically operatable means; and a free stylus included in the first named electric circuits adapted for selective electrical contact with any of said key-contacts.

2. An electric key-board for the described purpose, comprising multiple rows of duplicated key-contacts; electrically operated means adapted for connection with the recording mechanism of the machine to which the key-board is applied; electric circuits including said rows of key contacts and operatable means respectively; other electrically operated means; electric circuits including said duplicated key-contacts and said other operatable means respectively; means operated by said other electrically operatable means for variably limiting the operation of the first electrically operatable means; a stylus adapted for selective electrical contact with any of said key-contacts; and a flexible electrical conductor forming the sole connection of the stylus and including it in the first named electric circuits.

In testimony whereof I have signed my name to this specification in the presence of two subscribing witnesses.

WILLIAM F. DREW.

Witnesses:
WM. F. BOOTH,
D. B. RICHARDS.